United States Patent [19]

Weissman et al.

[11] Patent Number: 5,169,822

[45] Date of Patent: Dec. 8, 1992

[54] CATALYSTS FOR REMOVAL OF IMPURITIES BY THE HYDROPROCESSING OF HYDROCARBONS

[75] Inventors: Jeffrey G. Weissman, Wappingers Falls; Gerald G. Sandford, Glenham; Max R. Cesar, Newburgh, all of N.Y.

[73] Assignee: Texaco Inc., White Plains, N.Y.

[21] Appl. No.: 716,481

[22] Filed: Jun. 17, 1991

[51] Int. Cl.$^5$ .................. B01J 21/06; B01J 21/04; B01J 21/08; B01J 23/85; B01J 23/88
[52] U.S. Cl. ............................ 502/255; 502/308; 502/313; 502/315; 502/314; 502/254
[58] Field of Search .............. 502/308, 309, 313, 315, 502/314, 254, 255

[56] References Cited

U.S. PATENT DOCUMENTS

| | | | |
|---|---|---|---|
| 3,997,431 | 12/1976 | Beuther et al. | 208/216 R |
| 4,018,714 | 4/1977 | Wilson et al. | 502/309 |
| 4,490,479 | 12/1984 | Vogel et al. | 502/308 X |
| 4,657,663 | 4/1987 | Gardner et al. | 502/309 X |

Primary Examiner—W. J. Shine
Assistant Examiner—Douglas J. McGinty
Attorney, Agent, or Firm—Robert A. Kulason; James J. O'Loughlin; Vincent A. Mallare

[57] ABSTRACT

A catalyt composition for removal of sulfur and nitrogen in the hydroprocessing refinery of hydrocarbon streams. The composition comprises supported molybdenum or tungsten and containing cobalt or nickel. In addition, the presence of a third metal selected from the group consisting of titaniun, zirconium, and hafnium, deposited in a non-aqueous fashion, is provided.

16 Claims, No Drawings

CATALYSTS FOR REMOVAL OF IMPURITIES BY THE HYDROPROCESSING OF HYDROCARBONS

BACKGROUND OF THE INVENTION

This invention relates to the hydroprocessing of hydrocarbons and more particularly to a material suitable for use in the catalytic removal of sulfur and nitrogen from gas oils, as practiced in the hydrocarbon refining industry, in a process commonly referred to as hydroprocessing.

A solid catalyst, such as the material of this disclosure, is contained inside of a reactor in which the material to be hydroprocessed is passed over the catalyst together with a flow of hydrogen, at comparatively moderate temperatures and pressures and flow rates. In customary practice, the catalyst consists of metal oxides on a support, the oxides being converted to sulfides to produce an active, stable catalyst prior to use. The product is a gas oil in which the sulfur and nitrogen content has been substantially reduced. Any improvement in this process, especially as relating to the use of a material having improved activity for catalyzing this reaction, will result in significant economic savings.

Catalytic hydroprocessing, as currently practiced, uses a material consisting of active metals, either molybdenum or tungsten and either nickel or cobalt, possibly with promoters, on an inert support consisting of alumina or silica or mixtures of these. The use of different supports or other supported metals has been found to either enhance or decrease the activity of the base catalyst. Also, varying the method of preparation of these materials can also result in a change in catalytic activity.

Hydroprocessing catalysts have been traditionally prepared by depositing aqueous solutions of molybdenum, tungsten, nickel and cobalt salts onto a support; either in separate steps or by co-deposition. Alternately, the support and the deposited metals can be formed simultaneously. Intermediate and final calcining steps are necessary to produce the final form of the catalyst, an alumina support holding more-or-less dispersed molybdenum, tungsten, nickel and cobalt oxides. Numerous variations in both methods and compositions of this procedure have been described.

Improvements in these materials can be effected. One such method through the addition of other elements, specifically those designed to interact with the support or catalytically active metals. By doing so the utilization of active metals can be increased without necessarily adversely affecting support properties and without the need for increasing the content of active metals. Hence a small increase in the cost of the catalyst, as necessitated by the additional components, can result in significant savings by permitting operation of the hydroprocessing process at less severe conditions or at higher throughput.

It is, therefore, an object of the present invention to provide a material, suitable for use as a hydroprocessing catalyst, containing molybdenum, tungsten, nickel and cobalt on a support, and containing a third metal.

Another object of the present invention is to provide a material in which the third metal is an metal alkoxide deposited in an essentially water-free environment, while the other metals are deposited in aqueous solutions.

A further object of the present invention is to provide a material in which the third metal is selected from a group consisting of titanium, zirconium, and hafnium, or combinations of these three.

Moreover, another object of the present invention is to provide a process for the removal of sulfur and nitrogen from hydrocarbon streams, employing a material of this disclosure as an improved hydroprocessing catalyst.

DISCLOSURE STATEMENTS

U.S. Pat. No. 3,968,027 discloses the use of $TiCl_4$ dissolved in heptanes, while 4,0118,714 teaches the use of alkyl titanates of general formula $Ti(OR)_4$ dissolved in organic solvents.

Other patents have disclosed the necessity of using aqueous solutions of metal salts, such as $TiCl_4$ or other soluble titanium salts, dissolved in water, these include U.S. Pat. Nos. 3,997,431; 4,080,286 and 4,687,757.

U.S. Pat. No. 4,687,568 discloses the use of $ZrO(NO_3)_2.5H_2O$ in aqueous solutions. All of these methods of depositing a third metal have been found unsuitable for the preparation of the materials of this disclosure, as will be illustrated in the Examples.

SUMMARY OF THE INVENTION

The present invention provides a method of preparing a catalyst composition for hydroprocessing hydrocarbons, comprising
(a) depositing a first metal onto a support layer;
(b) optionally, calcining the first metal on said support layer;
(c) depositing a second metal onto the support layer;
(d) optionally, calcining the second metal on said support layer; and
(e) depositing a third metal on said support layer and calcining said third metal on said support layer, whereby the catalyst is provided for hydroprocessing hydrocarbons.

DETAILED DESCRIPTION OF THE INVENTION

Materials, i.e., catalysts prepared according to the present invention have been found to be active for the catalytic removal of sulfur and nitrogen from hydrocarbon refinery streams while having minimal hydrocracking activity.

It has now been found that by adding a metal alkoxide to a hydroprocessing catalyst containing two active metals upon alumina, a significant and surprising increase in the overall sulfur and nitrogen removal activities is found, as compared to a material not containing a metal alkoxide. This is surprising as G. Muralidhar, F. E. Massoth, and J. Shabtai, in *Journal of Catalysis*, volume 85, pp. 44-52 1984, found that the addition titanium isopropoxide, $Ti[OCH(CH_3)_2]_4$, to a typical cobalt and molybdenum oxides supported on alumina catalyst resulted in a significant decrease in sulfur removal activity as compared to an ordinary Co-Mo catalyst. In addition, they found that the degree of hydrocracking of the feed, a undesirable side reaction, was strongly increased. In the processes of the current invention, no significant hydrocracking was observed.

The exact nature of the support is unimportant, as long as the support material is moderately reactive with metal alkoxides, as will be described below. While the deposition of molybdenum, tungsten, cobalt and nickel onto the support can be by any convenient manner, We have found that the addition of a third metal in the form of an alkoxide, deposited in an essentially water-free environment, is necessary for the preparation of materials of this disclosure.

The support composition to be utilized in preparing a material according to the process of the current invention should be a non-zeolitic refractory inorganic oxide or a zeolitic or molecular sieve type material, and should have, particle sizes between 300 microns and 0.25 inches (6350 microns), i.e. not a fluidizable material and not a monolithic material. The support should contain micropores, with an average pore radius of monomodal functionality from between 20 Å and 1000 Å preferably between 20 and 250 Å; and should have a surface area from between 50 and 500 m$^2$/g, preferably greater than 200 m$^2$/g. In addition, the support should have a pore volume of from 0.1 to 2.0 ml/g, preferably at least 0.5 ml/g.

The support composition should be of a material that is resistant to chemical and physical modifications that may result from exposure to the processes of this disclosure or from exposure to conditions occurring in the use of this material, as in during a hydroprocessing reaction. In addition, the support should be relatively inert to catalyzing reactions during hydroprocessing. In addition, the support should contain a sufficient concentration of hydroxyl groups (OH) on its surface to provide for the stabilization of metal alkoxides placed onto the support; such surface hydroxyl concentrations can range from 0.1 to 20 surface OH groups per nm$^2$, preferable from 1 to 10 surface OH groups per nm$^2$.

Support materials meeting these criteria include, but are not limited to: amorphous silica; gamma, eta, beta, delta, or alpha alumina; mixtures of SiO$_2$'s and Al$_2$O$_3$'s; rutile, anatase, brookite, or mixtures of these; amorphous or crystalline zirconia, or molecular sieves of various types. Materials that are not fully oxidized, such as various carbons or aluminum hydroxides such as boehmite, are not suitable supports, as they may undergo undesirable transformations when exposed to the processes of this invention. Preferred support materials are SiO$_2$ or Al$_2$O$_3$ or mixtures of these, each of which is available commercially; more preferred is gamma-Al$_2$O$_3$. The support can consist of either powders, pellets, or shaped extrudates, as long as the final form meets the criteria listed above. Also, the support should be relatively free from other elements, such as phosphorus, boron, alkali metals, alkaline metals, and other elements not specified.

Three groups of metals are to be deposited onto the support: (1) molybdenum or tungsten or both, (2) titanium, zirconium, and hafnium, or combinations of these, (3) nickel or cobalt or both. Each group of elements is deposited in a separate step; or alternately, the first and last group can be deposited together. Several schemes can be used to deposit these metals onto the support, these steps will be fully described:

I.
1. deposit Ti, Zr or Hf or combinations
2. deposit Mo or W or both
3. deposit Ni or Co or both II.
1. deposit Ti, Zr, or Hf or combinations
2. co-deposit Mo or W or with both Ni or Co or both III.
1. deposit Mo or W or both
2. deposit Ni or Co or both
3. deposit Ti, Zr or Hf or combinations IV.
1. co-deposit Mo or W or both with Ni or Co or both
2. deposit Ti, Zr or Hf or combinations V.
1. deposit Mo or W or both
2. deposit Ti, Zr, or Hf or combinations
3. deposit Ni or Co or both After each deposition step, a calcining step, as described below, may be undertaken. The calcining step is required after deposition of Mo, W, Ni, or Co, but can be optional after deposition of Ti, Zr or Hf. No advantage is seen of one of these schemes over the others, however, I, II, and V are preferred. However, deposition of Ni or Co first, followed by calcining, is not preferred; also, calcining is required after the final deposition step. Each preparation step will be described separately, and can be performed in the order according to schemes I through V.

Deposition of molybdenum or tungsten or both, is performed using a suitable water soluble compound of Mo or W. Preferred compounds are (NH$_4$)$_6$Mo$_7$O$_{24}b$.4H$_2$O and (NH$_4$)$_2$WO$_4$ or other ammonium salts of various water content. The Mo or W compounds are dissolved in sufficient water to effect complete solution. This solution is placed onto the support by the incipient wetness technique, in which enough liquid is used to fully saturate all of the pores of the support, but with no excess liquid remaining outside of the support. If the volume of liquid required to dissolve all of the Mo or W compound is greater than the pore volume of the support, then the solution can be added in batches, with intermediate drying steps between each batch. Such drying steps involve heating the support up to, but not above, 110° C. for sufficient time to remove all of the water contained in the support, either at atmospheric pressures or in vacuum.

Deposition of nickel or cobalt or both, is performed using the same procedure as described above for Mo or W. Suitable Ni or Co compounds include any compounds easily soluble in water, such as nitrates, sulfates, or halides. Ni(NO$_3$)$_2$.6H$_2$O and Co(NO$_3$)$_2$6H$_2$O are preferred.

Deposition of Ti, Zr or Hf, is performed using an alkoxide compound soluble in alcohol or paraffinic solvents, such as ethanol, methanol, hexanes, or heptanes. The metal alkoxides have general formula M(OR)$_n$, where M is the metal and R is an alkyl group of general formula C$_i$H$_{2i+1}$, with i usually having values of 1, 2, 3 or 4, and n is the valance of the metal, up to n different R groups can occur in each compound. Values of n can range from 1 to 5, n being 4 for Ti, Zr and Hf. In addition, the metal alkoxides may occur as adducts with alcohols, such alcohols may or may not be based on the same R grouping. Metal alkoxides are characterized by having metal to oxygen to carbon bonds, as opposed to direct metal to carbon bonds occurring in alkyl metal compounds. These metal alkoxides are usually liquids, although solid metal alkoxides can also be employed. Their use is advantageous in that they can be obtained in high purity, avoiding contaminants that are potentially harmful, are convenient to use, and are readily decomposed to the metal oxide. Compounds useful in preparing materials of this disclosure include, but are not limited to:

titanium isobutoxide Ti(OCH(CH$_3$)C$_2$H$_5$)$_4$
titanium n-butoxide Ti(OC$_4$H$_9$)$_4$
titanium ethoxide Ti(OC$_2$H$_5$)$_4$
titanium 2-ethylhexoxide Ti(OCH$_2$CH(C$_2$H$_5$)C$_4$H$_9$)$_4$
titanium methoxide Ti(OCH$_3$)$_4$ titanium n-propoxide $Ti(OC_3H_7)_4$
titanium isopropoxide $Ti(OCH(CH_3)_2)_4$
zirconium n-butoxide $Zr(OC_4H_9)_4$
zirconium t-butoxide $Zr(OC(CH_3)_3)_4$
zirconium isopropoxide $Zr(OCH_2(CH_3)_2)_4$
zirconium ethoxide $Zr(OC_2H_5)_4$
zirconium n-propoxide $Zr(OC_3H_7)_4$
zirconium pentyloxide $Zr(OC_5H_{11})_4$
hafnium t-butoxide $Hf(OC(CH_3)_3)_4$
hafnium ethoxide $Hf(OC_2H_5)_4$
hafnium isopropoxide $Hf(OCH(CH_3)_2)_4$
zirconium n-butoxide butanol complex $Zr(OC_4H_9)_4 \cdot C_4H_9OH$ zirconium isopropoxide isopropanol complex $Zr(OCH_2(CH_3)_4 \cdot (CH_3)_2CHOH$ Of these metal alkoxide compounds, all of which are presently available commercially, Ti n-butoxide, Ti isobutoxide, Ti i-propoxide, Zr n-butoxide, Zr n-propoxide, and Hf ethoxide are preferred, the adduct Zr n-butoxide butanol is also preferred.

Working in a water-free environment, such as in a inert-gas purged container, the metal alkoxide is mixed with a solvent to produce a sufficient volume of solution to fill the pores of the support. Prior to use, the support can be dried to remove free and adsorbed water. Such drying can involve heating at temperatures not greater than about 110° C. or exposure to vacuum or both, for a sufficient period of time to effect removal of all water. The support is then mixed with the solution containing the metal alkoxide. At no point during these steps should water or water vapor be allowed to contact any of the components. After all of the solution is placed onto the support by using the incipient wetness deposition method, the saturated support can now be exposed to normal atmospheric conditions. The alkoxide containing material is dried as described to remove excess solvent.

An alternative method of contacting the support with the metal alkoxide involves employing the technique of equilibrium adsorption, again performed in an inert atmosphere. In this method the metal alkoxides are mixed with a quantity of solvent, which is then mixed with the dried support. The solvent is a non-aqueous water free alcohol or paraffinic liquid, such as ethanol, methanal, hexanes, or heptanes. Sufficient solvent is used so that the mixture can be agitated while keeping the support completely immersed in the solvent. Typically, total volume of the solvent used is two to four times the bulk volume of the support. The support and solution is allowed to mix for enough time to reach equilibrium, at which point an equilibrium amount of the metal alkoxide is adsorbed or reacted with the support. The excess solvent and metal alkoxide, if any, is then filtered from the support, and the alkoxide material is exposed to normal atmospheric conditions and dried to remove excess solvent.

After deposition of the metal alkoxide the material can be calcined to fully oxidize the metal, also calcining is necessary after deposition of Ni, Co, Mo, or W to decompose the metal compounds and convert the metals to the corresponding oxides. Calcining involved flowing oxygen or air or an oxygen containing inert gas over the material at a rate sufficient to remove reaction products arising from the decomposition of the metal oxide precursor compounds. Such calcining can be done at from 300° C. to 1000° C. for up to 48 hours, preferably at from 400° C. to 600° C. from between 1 and 6 hours. Alternatively, for the case of calcining after deposition of Ti, Zr, or Hf, the calcining can be done at from 100° C. to 1000° C. for up to 48 hours, preferably at from 200° C. to 600° C. from between 1 and 6 hours, and more preferably from 300° C. to 600° C. from between 1 and 6 hours.

The composition of a catalyst prepared by any of the schemes described above can range from 0.5 to 40 wt % of either Mo or W or both Mo and W, measured as metal content but occurring as an oxide, from 0.5 to 20 wt % of either Co or Ni or both Co and Ni, measured as metal content but occurring as an oxide, and from 0.1 to 10 wt % of Ti, Zr or Hf or combinations, measured as metal content but occurring as an oxide. A more preferred composition may be from 5 to 15 wt % Mo or W, from 1 5 to 4 wt % Ni or Co, and from 0.5 to 4 wt % of Ti, Zr, or Hf or combinations, measured as metal content but occurring as the oxides. Of Ti, Zr and Hf, Ti and Zr are preferred, with Zr being more preferred. The balance of the weight in all of these cases consists of the support material.

The quantities of metals deposited onto a support of high surface area, 200 to 350 $m^2/g$, are such that the support is not fully covered by any one metal. That is, none of the metals, Mo, W, Ti, Zr, Hf, Ni or Co, are present in sufficient quantities to form a monolayer on the support. However, the metals may occur as multilayer aggregates covering a small portion of the support. Regardless of which scheme is followed, all metals have an opportunity to be directly contacted with the support, allowing the metal alkoxide to react with the surface hydroxyl groups of the support. Surface concentrations of the metals can be measured by X-ray photoelectron spectroscopy (XPS), as described in "An Introduction to Chemisorption and Catalysis by Metals," by R. P. H. Gasser, pp. 143–146, Oxford University Press, 1985. Different methods are used to measure surface concentration, for the purposes of this disclosure surface concentration of a metal will be defined as the fraction of that metal compared to all the metals present, disregarding contributions from oxygen, carbon, and impurities. Thus the sum of the concentrations of each metal should add to unity. Although not a requirement of this disclosure, the surface concentrations of the metals employed in this disclosure are preferably in the range of 0.05 to 0.20 for Mo and W, 0.01 to 0.10 for Ti, Zr and Hf, and 0.02 to 0.10 for Ni or Co, with the balance being the support metal(s). Surface coverage greater than these preferred ranges have been found to result is less active catalysts.

After the final calcining step, this material is then treated so that the active metals are sulfided. This can involve several procedures. One method is to load the material into a hydroprocessing reactor, followed by contacting with sulfur containing compounds. Such contacting can be by $H_2S$ mixed with $H_2$ in concentrations ranging from 0.5 to 20 wt % and under conditions ranging from 250° to 500° C. and from 0 to 1000 psig, under a continuous flow at rates from 1 to 50 SCCM of gas per ml of catalyst and from 0.5 to 10 hrs. Alternatively, the catalyst can be contacted with a non-aqueous solution of a reactive sulfur containing compound, such as thiols, sulfides and disulfides, including compounds such as propanethiol, butyl disulfide, or other suitable compounds. Solvents can include refinery hydrocarbon streams such as gas-oils, paraffinic liquids such as hexanes, or other suitable non-aqueous solvents. The solution, containing at least enough sulfur to stoichiometrically sulfide the catalyst is contacted with the material to be sulfided by completing filling the catalyst bed with the liquid under conditions ranging from 20° to 110° C. and from 0 to 1000 psig and from no flow to 10.0 LHSV and from 0.5 to 10 hrs. Alternatively, the liquid solution can be contacted with the material to be sulfided outside of the hydroprocessing reactor, in any suitable equipment. The sulfided catalyst is then dried in an oxygen-free environment and placed into the hydroprocessing reactor.

After the sulfiding procedure is complete, the material can be used as a catalyst for hydroprocessing of refinery hydrocarbon streams, such as light cycle gas oils, heavy cycle gas oils, naphthenates, vacuum gas oils, or any other refinery streams used in a typical hydroprocessing reaction. The use and operation of hydroprocessing reactions is well known and carried on extensively in practical operation. Typical operating conditions for the catalyst of this invention may range, but are not limited to, from 200° to 600° C., from 0 to 2500 psig, from 0.2 to 10 liquid LHSV of the hydrocarbon stream to be hydroprocessed, and from 1.0 to 20.0 SCCM of gas per cc of liquid, the gas consisting of recycle and makeup as so to contain at least 60% $H_2$.

Although this disclosure is not intended to present theories on the mechanisms of reactions occurring in the processes herein, a brief discussion will clarify the function and necessity of using metal alkoxides. Metal alkoxides are well known to undergo rapid hydrolysis upon exposure to air, or exchange reactions when contacted with electrophilic groups, such as surface hydroxyls on the preferred supports. In such as reaction, a OR group from a metal alkoxide is replace by a surface OH group on the support, thus creating a direct support-oxygen-metal bond, for example, according to: $Al—OH + M(OR)_n \rightarrow Al—O—M—(OR)_{n-1} + ROH$. In addition, the metal alkoxide, after exposure to water or water vapor, either at normal temperatures or higher, i.e. calcining, is decomposed to the metal oxide, when supported this results in a direct support-metal oxide bond, according to: $Al—O—M—(OR)_{n-1} + (n-1)/2\text{-}H_2O \rightarrow Al—O—MO_{(n-1)/2} + (n-1)ROH$. It is believed that this structure results in a greater dispersion of the active metals, Ni, Co, Mo, and W, through reduction of active metal-support interactions, and may also contribute additional active sites, thus increasing the overall activity of the catalyst without increasing the quantity of active metals required.

The preparation and use of materials of this invention are further described by the following Examples as well as the advantages thereof.

EXAMPLE I

The preparation of a material according to this invention is described, employing scheme I. 320 g. of gammaalumina, consisting of particles between 420 and 840 microns, having a surface area of about 260 m²/g, a pore volume of 0.7 ml/g and average pore radius of 96 A was dried at 110° C. To this $Al_2O_3$ a solution of 75.2 g. zirconium n-propoxide, containing 30% free alcohol, and 227 ml of ethanol was added by incipient wetness, under nitrogen. This material was dried by exposure to atmosphere for 16 hours, then calcined at 500° C. for 3 hours. To 156 g. of this product a solution of 111 ml of deionized water and 29.2 g of $(NH_4)_6Mo_7O_{24}\cdot 4H_2O$ was added to the alumina via the incipient wetness technique. This was dried at 110° C. under vacuum and then was calcined in air at 500° C. for 3 hours. Onto 44.3 g. of this product was added a solution of 8.0 g $Co(NO_3)_2\cdot 6H_2O$ and 29.0 ml water by incipient wetness, dried at 110° C. under vacuum and then calcined at 500° C. for three hours.

EXAMPLE 2

The description of a procedure used to test the materials of this invention as hydroprocessing catalysts is described. A quantity of the material to be tested is placed inside of a stainless steel tube reactor. The material is sulfided in a 10 wt % mixture of $H_2S$ in $H_2$ at a rate of 9 SCCM per ml of catalyst at 300° C. and at atmospheric pressure. After completion of sulfiding, hydroprocessing is commenced under the following conditions: gas flow is switched to pure $H_2$ at 9 SCCM per ml of catalyst, and a liquid flow of 2 ml/hr per ml of catalyst, corresponding to 2 liquid-hourly space velocity, started, with the overall reactor pressure being held at 400 psi and operated at 300° C. The liquid feed is representative of the type treatable by the catalysts of this invention, consisting of a light straight-run gas oil (LSRGO) having the properties described below in Table 1. After operating in this mode for a minimum of 18 hours, liquid products are removed for analysis for sulfur and nitrogen content by X-ray fluorescence and chemiluminescence, respectively. Note that the hydroprocessing conditions selected allow for only partial hydrodesulfurization and hydrodenitrogenation of the feed; these conditions facilitate comparisons between different materials.

TABLE 1

| Properties of LSRGO | |
|---|---|
| Gravity | 35.9° |
| IBP | 478° F. |
| 10% | 503° F. |
| 50% | 536° F. |
| 90% | 592° F. |
| FBP | 648° F. |
| S, wt % | 1.37 |
| N, ppm | 83. |

EXAMPLE 3

The preparation of a material not according to the processes of this invention is described, for the purposes of showing improvements in the art that this invention allows. Similar to scheme I, but with step 1 omitted, and using the same preparation procedures and gamma-$Al_2O_3$ support as described in Example I, 14.55 g of $(NH_4)_6Mo_7O_{24}\cdot 6H_2O$, and 16.0 g of $Co(NO_3)_2\cdot 6H_2O$ was placed onto 80 g $Al_2O_3$. After each deposition, the product was calcined at 500° C. for three hours.

EXAMPLE 4

The materials prepared in Examples and 3 were tested as catalysts according to the procedure of Example 2, results of which are presented below in Table 2. 50 cm³ of the material of Example 1 and 10 cm³ of the material of Example 3 were placed in the reactor system according to Example 2, in separate runs, with the gas and liquid flow rates adjusted accordingly. These results clearly illustrate the advantages the material of this invention has for the catalytic removal of sulfur and nitrogen from gas oils, as compared to a material prepared in the absence of a metal alkoxide.

TABLE 2

Comparison Of Materials From Examples 1 and 3

| Ex. | g/100 g $Al_2O_3$ | | | Conversion | |
|---|---|---|---|---|---|
| | Mo | Co | Zr | S | N |
| 1 | 10.8 | 4.5 | 4.6 | 79 | 22 |
| 3 | 9.9 | 4.0 | — | 63 | 18 |

EXAMPLE 5

This example compares a material prepared according to the process of this invention with a similar material, not of this invention, as catalysts for the removal of sulfur and nitrogen from gas oils.

Using the same preparation methods, preparation scheme, and alumina as in Example 1: to 320 g. of $Al_2O_3$ a solution of 75.2 g. zirconium n-propoxide, containing 30% free alcohol, and 227 ml of ethanol was added by incipient wetness, under nitrogen. This material was dried by exposure to atmosphere for 16 hours, then calcined at 500° C. for 3 hours. To 156 g. of this product a solution of 111 ml of deionized water and 29.2 g of $(NH_4)_6Mo_7O_{24}.4H_2O$ was added to the alumina via the incipient wetness technique. This was dried at 110° C. under vacuum and then was calcined in air at 500° C. for 3 hours. Onto 44.3 g. of this product was added a solution of 8.0 g $Ni(NO_3)_2.6H_2O$ and 29.0 ml water by incipient wetness, dried at 110° C. under vacuum and then calcined at 500° C. for three hours.

Using the same preparation methods, preparation scheme, and alumina as in Example 3, 45.5 g of $(NH_4)_6Mo_7O_{24}.6H_2O$ were placed onto 250 g of $Al_2O_3$, then dried and calcined. Onto 50 g. of this product 10.00 g of $Ni(NO3)_2.6H_2O$ was placed, then dried and calcined. These two products were tested according to the procedure of Example 2, using 50 and 20 cm$^3$, respectively, with flow rates adjusted accordingly. Comparison of the results presented below in Table 3. These results illustrate the advantage of using the material of this invention for the catalytic removal of sulfur and nitrogen for gas oils, as compared to a similar material prepared in the absence of metal alkoxides.

TABLE 3

Comparison Of Materials Prepared In Example 5

| g/100 g $Al_2O_3$ | | | Conversion | |
|---|---|---|---|---|
| Mo | Ni | Zr | S | N |
| 10.8 | 4.5 | 4.6 | 72 | 22 |
| 9.9 | 4.6 | — | 66 | 11 |

EXAMPLE 6

This Example illustrates an alternative embodiment of a material prepared according to the processes of this invention, and the applicability of using this material as a catalyst for the removal of sulfur and nitrogen from gas oils. Using the same deposition procedures and alumina support of Example and employing deposition scheme I, 6.5 ml of titanium isopropoxide was placed onto 25 g of $Al_2O_3$, then calcined at 500° C. for 3 hours. 4.15 g of $(NH_4)_6Mo_7O_{24}.6H_2O$ and 3.14 g of $Ni(NO_3)_2.6H_2O$ was placed onto this product in separate steps, with calcining at 500° C. for 3 hours after each step. 45 cm$^2$ of this product was placed into the reactor and tested as described in Example 2, with flow rates adjusted accordingly. The liquid product of this test was found to have a 60% reduction in sulfur and 17 % reduction in nitrogen content.

EXAMPLE 7

This example illustrates, through comparison, the advantages of employing a material of this invention as compared to a similar material, through use of a water soluble salt as opposed to a metal alkoxide. Using the same preparation procedure, scheme and alumina support as in Example 5, 7.27 g of $(NH_4)_6Mo_7O_{24}.6H_2O$, 6.21 g of $ZrO(NO_3)_2 l.xH_2O$, containing 25.5 wt % $H_2O$, and 7.99 g of $Ni(NO_3)_2.6H_2O$ were placed onto 40.0 g of $Al_2O_3$. This product was tested in the reactor system described in Example 2 and compared with the products tested in Example 5, the results of which are presented below in Table 4. This results clearly indicates the disadvantage of using a water soluble salt to prepare a material, and the advantage of using a metal alkoxide according to the procedures of this invention.

TABLE 4

Comparison Of Materials Prepared In Examples 5 and 7

| Ex | g/100 g $Al_2O_3$ | | | Zirconium Precursor | Conversion | |
|---|---|---|---|---|---|---|
| | Mo | Ni | Zr | | S | N |
| 5 | 10.8 | 4.5 | 4.6 | alkoxide | 72 | 22 |
| 7 | 9.9 | 4.0 | 4.6 | nitrate | 57 | 21 |
| 5 | 9.9 | 4.6 | — | none | 66 | 11 |

EXAMPLE 8

This example illustrates, through comparison, the advantages of employing a material of this invention as compared to a similar material, through use of a water soluble salt compared with a metal alkoxide. Using the same preparation methods and alumina support as in Example 1, but employing deposition scheme V, 45.46 g $(NH_4)_6Mo_7O_{24}.6H_2O$ was placed onto 250 g $Al_2O_3$ and calcined. Onto 40.0 g of this product, 8.0 ml of zirconium n-butoxide butanol complex and 7.13 g of $Ni(NO_3)_2.6H_2O$ were added. Repeating this procedure except with a different Zr precursor, not of this invention, 7.27 g of $(NH_4)_6Mo_7O_{24}.6H_2O$, 6.21 g of $ZrO(NO_3)_2.xH_2O$ containing 5.5 wt % $H_2O$, and 7.99 g of $Ni(NO_3)_2.6H_2O$ were placed onto 40.0 g of $Al_2O_3$. These products were tested in the reactor system described in Example 2 and the results presented below in Table 5. This results clearly indicates the disadvantage of using a water soluble salt to prepare a material, and the advantage of using a metal alkoxide according to the procedures of this invention.

TABLE 5

Comparison Of Materials Prepared In Example 8

| g/100 g $Al_2O_3$ | | | Zirconium Precursor | Conversion | |
|---|---|---|---|---|---|
| Mo | Ni | Zr | | S | N |
| 9.9 | 4.1 | 5.1 | alkoxide | 68 | 18 |
| 9.9 | 4.0 | 4.6 | nitrate | 59 | 17 |

EXAMPLE 9

This Example illustrates an alternative embodiment of a material prepared according to the processes of this invention, and the applicability of using this material as a catalyst for the removal of sulfur and nitrogen from gas oils. Using the same deposition procedures and alumina support of Example 1, and employing deposition scheme III, 45.46 g of $(NH_4)_6Mo_7O_{24}.6H_2O$ was placed onto 250 g of $Al_2O_3$, and calcined at 500° C. for 3 hours. 17.67 g of $Ni(NO_3)_2.6H_2O$ was placed onto 106.2 g of this product and then calcined at 500° C. for 3 hours. 6.3 ml of zirconium n-butoxide butanol complex was placed onto 35.4 g of this product, then calcined at 500° C. for 3 hours. 45 cm³ of this product was placed into the reactor and tested as described in Example 2, with flow rates adjusted accordingly. The liquid product of this test was found to have a 58 % reduction in sulfur and 9 % reduction in nitrogen content.

EXAMPLE 10

This example illustrates alternative embodiments of materials prepared according to the processes of this invention, and the applicability of these materials as catalysts for the removal of sulfur and nitrogen from gas oils. Employing deposition scheme I, 100 g of the alumina support described in Example 1, 167 ml of zirconium n-butoxide butanol complex, and 250 ml of methanol were mixed in a flask for several hours, using the equilibrium adsorption technique. This product was filtered from the liquid and washed several times with methanol, and then dried under vacuum at 110° C. for 3 hours, and was not calcined. Onto half of this product, 9. g of $(NH_4)_6Mo_7O_{24}.6H_2O$ and 8.9 of $Ni(NO_3)_2.6H_2O$ were deposited in separate steps by the incipient wetness technique, with calcining at 500° C. for 3 hours after each step. Separately, using the same procedures but with deposition Scheme V, onto 25 g of the same $Al_2O_3$ 4.15 g of $(NH_4)_6Mo_7O_{24}.6H_2O$ was added followed by a calcining step. Onto thus product 21 ml of titanium isopropoxide and 200 ml of ethanol were mixed by the equilibrium adsorption technique for several hours. The product was dried, and then 3.14 g $Ni(NO_3)_2.6H_2O$ was added, followed by calcining. 50 cm³ and 45 cm³ of each product, respectively, were tested according to Example 2, with flow rates adjusted accordingly. The results are presented below in Table 6, illustrating the materials made according to the processes of this invention, in which a metal alkoxide is deposited by equilibrium adsorption, are useful as catalysts for hydroprocessing of gas oils.

TABLE 6

| Comparison Of Materials In Example 10 | | | | | |
|---|---|---|---|---|---|
| g/100 g $Al_2O_3$ | | | | Conversion | |
| Mo | Ni | Zr | Ti | S | N |
| 9.9 | 3.6 | 3.0 | — | 69 | 32 |
| 9.9 | 2.5 | — | 4.9 | 67 | 15 |

EXAMPLE 11

This example illustrates, through comparison, the advantages of employing a preferred material of this invention as compared to similar materials, where in one case the similar material is prepared using an organic liquid soluble inorganic salt as opposed to a metal alkoxide. Such a method is described in *Applied Catalysis*, vol. 45, pp. 221-238, 1988, in which catalysts were prepared using TiCl. An additional material is prepared in a similar fashion, except using the methods described in this invention and employing a metal alkoxide. Both of these materials are compared against preferred materials of this invention, two of which are described in Examples 10 and 6. This example describes improvements afforded by the current preferred invention.

Using the same preparation methods and alumina support as in Example 6, but employing deposition Scheme III, 45.46 g of $(NH_4(_6Mo_7O_{24}.6H_2O$ was added to 250.0 g of $Al_2O_3$, this material was then dried and calcined. Onto 100.0 g. of this product, 17.4 g of $Ni(NO_3)_2.6H_2O$ was added, and this product dried and calcined. Onto 48.6 g. of this product, 23.0 ml of titanium isopropoxide in 13.5 ml of ethanol was added, and this product dried and calcined.

Similarly, 8.5 ml of TiCl in 26.5 ml of ethanol were added onto an additional 48.6 g of the NiMo/$Al_2O_3$ material prepared above, and then dried in open atmosphere for one week and then calcined. These two products were tested in the reactor system described in Example 2, the results of which are presented below in Table 7 and compared with the results of Examples 10 and 6. These results clearly indicate the disadvantage of using an inorganic salt, although dissolved in an organic solvent, to prepare a material, and the advantage of using a metal alkoxide according to the preferred procedures of this invention, with the advantage that the preferred materials require less metals content to achieve equivalent or superior conversion activity.

TABLE 7

| Comparison Of Materials In Examples 11, 10 and 6 | | | | | |
|---|---|---|---|---|---|
| | g/100 g $Al_2O_3$ | | Titanium | Conversion | |
| EX | Mo | Ni | Ti | Precursor | S | N |
| 11 | 9.9 | 4.0 | 9.1 | alkoxide | 52 | 16 |
| 11 | 9.9 | 4.0 | 9.1 | chloride | 61 | 21 |
| 10 | 9.9 | 2.5 | 4.9 | alkoxide | 60 | 17 |
| 6 | 9.0 | 2.5 | 4.2 | alkoxide | 67 | 15 |

EXAMPLE 12

This example describes comparative examples in which catalysts are prepared according to U.S. Pat. Nos. 4,720,472 and 4,795,666 of Parrott, in which a mixed alkoxide solution, containing two metals Si and Ti, is employed. These will be compared against catalysts prepared according to this invention in which only a single metal alkoxide is employed, according to the above Examples.

(A) A catalyst prepared according to Scheme I, and best duplicating catalyst 'CI' of '472 is described, and is here tested for hydroprocessing. In '472, the material was described and tested for hydrocracking, a related but distinct process. Similar to the procedure described in Example 1, a mixture of 14.2 g. of titanium butoxide, 9.4 g. of tetraorthosilane, $Si(C_2H_5O)_4$, and 7 ml of ethanol were added to 40.0 g. of $Al_2O_3$ in an inert atmosphere. Prior to use the $Al_2O_3$ was required to be kept under nitrogen purge in the inert atmosphere for 48 hours. The $Al_2O_3$, Si and Ti mixture was exposed to humid air, with stirring, for 24 hours, and dried at 110° C. for 3 hours in air and then calcined at 500° C. for 3 hours in air. To this product 13.0 g of $(NH_4)_6Mo_7O_{24}.6H_2O$ was added, and then 8.1 g. of $Ni(NO_3)_2.6H_2O$, as described in Example 1. This material was tested according to the procedures described in Example 2, the results being that 65% of the sulfur and 36% of the nitrogen were removed form the feed stream.

(B) A catalyst was prepared using the composition described in '472, but with a procedure identical to that used in Example 6, and compared with the catalyst of Example 6. Using Scheme I, 6.3 g. of tetraorthosilane, 10.3 g. titanium isobutoxide, and 12 ml of ethanol were added to 40.0 g. of $Al_2O_3$. In separate steps 7.3 g. of $(NH_4)_6Mo_7O_{24}.6H_2O$ and 8.0 g. of $Ni(NO_3)_2.6H_2O$ were then added. This product was tested as describe in Example 6, and the results compared below in Table 8, together with an additional Ti containing catalyst of this invention, described in Example 10.

TABLE 8

Comparison Of Materials From Examples 6, 10, And 12B

| Ex. | g/100 g Al$_2$O$_3$ | | | | Conversion | |
|-----|-----|-----|-----|-----|-----|-----|
|     | Mo  | Ni  | Zr  | Si  | S   | N   |
| 12B | 9.9 | 4.0 | 3.6 | 1.5 | 66  | 29  |
| 6   | 9.0 | 2.5 | 4.2 | —   | 60  | 17  |
| 10  | 9.9 | 2.5 | 4.9 | —   | 67  | 15  |

(C) A catalyst prepared according to '472, but using Zr in place of Ti, and compared with a catalyst of this invention described in Example 5, and a comparative catalyst described in Example 5. Using the same methods as described in Part A above, and according to deposition Scheme I, 9.4 g. of 70% zirconium n-propoxide in alcohol, 4.18 g. of tetraorthosilane and 14 ml of ethanol were added to 40.0 g. of Al$_2$O$_3$. As described above, 7.3 g of (NH$_4$)$_6$Mo$_7$O$_{24}$.6H$_2$O and 8.0 g. of Ni(NO$_3$)$_2$.6H$_2$O were then added in separate steps, and the product tested according to Example 2. The results of this test are compared to the catalysts of Example 5 below in Table 9.

TABLE 9

Comparison Of Materials From Examples 5 And 12C

| Ex. | g/100 g Al$_2$O$_3$ | | | | Conversion | |
|-----|------|-----|-----|-----|-----|-----|
|     | Mo   | Ni  | Zr  | Si  | S   | N   |
| 12C | 9.9  | 4.0 | 4.4 | 1.0 | 70  | 18  |
| 5   | 10.8 | 4.5 | 4.6 | —   | 72  | 22  |
| 5   | 9.9  | 4.6 | —   | —   | 66  | 11  |

This Example shows that while the catalysts of '472 are active for hydroprocessing, the catalysts of this invention are an improvement in that, as listed in Tables 8 and 9, are even more active for hydroprocessing. In addition, the catalysts of this invention are an improvement in that the additional processing steps required in '472 are not needed—that is, pretreatment of the support prior to alkoxide deposition, and exposure of the product to moist air after alkoxide deposition, allowing for a significantly faster and more economical method of producing the catalyst in the case of the current invention. In addition, the requirement of Si and P is described in '472 is shown not to be necessary, as the catalysts of this invention are more active without this complication. Again, the elimination of components to the product will result in a more economical and superior product.

We claim:

1. A method of preparing a catalyst composition for hydroprocessing hydrocarbons, comprising:
   (a) depositing a first metal onto a support layer;
   (b) calcining the first metal on said support layer;
   (c) depositing a second metal onto the support layer; and
   (d) calcining the second metal on said support layer; and
   (e) depositing a third metal on said support layer and calcining said third metal on said support layer, whereby the catalyst is provided for hydroprocessing hydrocarbons wherein the first, second, or third metal is deposited on said support layer via an organic solvent soluble Zr alkoxide.

2. The method of claim 1 wherein said first metal is selected from the group consisting of zirconium, and second metal is molybdenum or tungsten and said third metal is nickel or cobalt.

3. The method of claim 1, wherein said support layer is composed of a non-zeolite refractory oxide, a zeolite or molecular sieve; and having a particle size of about 300 microns to about 6350 microns, an average pore radius of from about 20 to about 1000 Å, a surface area of from about 50 to about 500 m$^2$/g and a pore volume of about 0.1 to about 2.0 ml/g.

4. The method of claim 3 wherein said support layer has a particle size of between 300 microns and 6350 microns, an average pore radius of about 20 to about 250 Å, a surface area between 50 and 500 M$^2$/g and a pore volume of from 0.1 to 2.0 ml/g.

5. The method of claim 3 wherein said support layer is comprised of compounds selected from the groups consisting of Al$_2$O$_3$, SiO$_2$, ArO$_2$ and mixtures thereof.

6. The method of claim 1 wherein said first metal is deposited via organic solvent soluble metal alkoxides of general formula M(OR)$_4$, where M is Zr, R is a hydrocarbon radical of general formula C$_n$H$_{2m+1}$, where n is an positive integer of a value of 1 to 4.

7. The method of claim 1 wherein said second metal is deposited on said support by means of aqueous solutions of water soluble salts of Ni(NO$_2$)$_2$.6H$_2$O or CO(NO$_3$)$_2$.6H$_2$O.

8. The method of claim 1 wherein said third metal is deposited on said support by means of aqueous solutions of water soluble salts of Ni(NO$_3$)$_2$.6H$_2$O or Co(NO$_3$)$_2$.6H$_2$O.

9. The method of claim 6, wherein said metal alkoxide is Zr[OC$_3$H$_7$]$_4$, Zr[OC$_4$H$_9$]$_4$.C$_4$H$_9$OH.

10. The method of claim 6 wherein the Zr alkoxide is Zr(OC$_4$H$_9$)$_4$.C$_4$H$_9$OH.

11. The method of claim 6, wherein said deposition of metals on said support layer is undertaken in essentially an anhydrous environment.

12. The method of claim 1 wherein the metal to be calcined is exposed to a gas containing oxygen at temperatures from 300° to 1000° C. for between 1 and 6 hours.

13. The method of claim 12 wherein the gas containing oxygen is air or oxygen.

14. The method of claim 1 wherein the catalyst material is comprised of from 0.5 to 40 wt % of Mo and W, from 0.5 to 20 wt % of Ni and Co, and from 0.1 to 10 wt % of Zr.

15. The method of claim 1, wherein the catalyst material is comprised of from 5 to 20 wt % of Mo and W, from 1.5 to 4 wt % of Ni and Co, and from 0.5 to 4 wt % Zr.

16. A method of preparing a catalyst composition for hydroprocessing hydrocarbons, comprising:
   (a) depositing a first metal of molybdenum or tungsten onto a support layer;
   (b) calcining the first metal on said support layer;
   (c) depositing a second metal selected from the group consisting of zirconium onto the support layer via an organic solvent soluble zirconium alkoxide;
   (d) calcining the second metal on said support layer; and
   (e) depositing a third metal of nickel or cobalt onto said support layer and calcining said third metal on said support layer, whereby the catalyst is provided for hydroprocessing hydrocarbons.

* * * * *